United States Patent [19]

Monks et al.

[11] 4,361,389
[45] Nov. 30, 1982

[54] CAMERA-RESPONSIVE CHARGING APPARATUS FOR AN ELECTRONIC STROBE FLASH UNIT

[75] Inventors: David E. Monks, Spencerport; Peter P. Lockner, Byron, both of N.Y.

[73] Assignee: Eastman Kodak Company, Rochester, N.Y.

[21] Appl. No.: 339,576

[22] Filed: Jan. 15, 1982

[51] Int. Cl.³ .................. G03B 15/05; G03B 17/38
[52] U.S. Cl. .................. 354/139; 354/145; 354/267
[58] Field of Search .......... 354/60 F, 127, 128, 354/139, 145, 149, 266–268

[56] References Cited

U.S. PATENT DOCUMENTS 3,953,864  4/1976  Iwata et al. ............... 354/145 X
4,084,167  4/1978  Iwata ....................... 354/149 X
4,085,413  4/1978  Karikawa ................. 354/267 X Primary Examiner—William B. Perkey
Attorney, Agent, or Firm—D. P. Monteith

[57] ABSTRACT

An electronic strobe flash unit in a camera is charged in response to actuation of a shutter-release member, and also in response to termination of a post-exposure film advance operation. These charging intervals are limited, respectively, by the actuation speed of the release member and by the time lapse between successive exposures. For supplementary charging of the flash unit, a potential charging delay is established, prior to exposure, when the release member is moved to a position in which the exposure operation is irreversibly initiated. This delay is potentially long enough to assure that the flash unit is charged sufficiently to produce a flash regardless of its previous condition, but is sufficiently brief to avoid disturbing the camera operator.

5 Claims, 4 Drawing Figures

CAMERA-RESPONSIVE CHARGING APPARATUS FOR AN ELECTRONIC STROBE FLASH UNIT

BACKGROUND OF THE INVENTION

1. Field of the Invention

This invention relates to a camera having an electronic strobe flash unit which charges in response to movement of a camera release member for effecting an exposure operation. More particularly, the invention assures a predetermined minimum amount of charging of the flash unit, prior to an exposure, independently of the actuation speed of the release member.

2. Description Relevant to the Prior Art

Many commercially available electronic strobe flash units have a manually operated on/off switch for charging the flash unit. When a camera operator wishes to use the flash unit, the switch is turned on, which connects a low-voltage battery to a DC to DC converter to charge the flash unit to a relatively high voltage. Should the operator fail to turn the switch off while the flash unit is idle, the converter continues to maintain the flash unit in a charged condition, thereby wasting battery energy. However, if the switch is turned off after the flash unit is fully charged, the unit will not remain charged indefinitely. It may fail to provide adequate illumination if considerable time elapses before the next exposure, unless the photographer remembers to again charge the unit. In this case, the previous charging energy is wasted and, even if the photographer remembers to recharge the unit just prior to exposure, a prized photograph may be missed because of the time lost in performing this function manually.

Various approaches to solving this problem have been directed to causing the flash unit to charge when the imminent use of the camera is predicted by some activity of the photographer.

U.S. Pat. Nos. 3,296,949 and 4,189,222 describe cameras having a power switch for a built-in electronic strobe flash unit. The switch is closed automatically, to cause charging of the flash unit, when a dust cover is moved to uncover a camera taking lens. When the camera is idle, battery energy is wasted unless the operator remembers to cover the lens.

U.S. Pat. No. 4,085,414 describes apparatus for automatically turning on and off an electronic strobe flash unit as a function of whether an associated camera is held in position in anticipation of taking a photographic picture. However, unless relatively elaborate multiple means are employed to sense vibration, gripping force etc, in addition to camera position, it is quite likely that the charger will remain activated when not desired because of the storage position of the camera, e.g. on a car seat, etc.

As an alternative approach to the same problem, it is also known in the prior art to provide for charging an electronic strobe flash unit in response to pre-exposure movement of a camera shutter-release member so that the flash unit is only charged when its associated camera is to be operated. For example, U.S. Pat. No. 3,651,372 describes a camera and a flash unit in which a camera operator is supposed to voluntarily delay final movement of the release member, which opens the shutter, until a flash-status lamp signals that the flash unit is sufficiently charged.

U.S. Pat. Nos. 3,953,864 and 4,007,469 describe other cameras having built-in flash units which are charged in response to pre-exposure movement of a shutter-release member.

In the above prior art employing pre-exposure movement of the shutter release member, a rapid uninterrupted stroke of the release member causes an exposure to occur without flash or an insufficient amount of flash illumination. For a flash exposure, actuation of the shutter-release member must be interrupted to allow for flash charging.

U.S. Pat. No. 4,239,361 describes a camera having a fast-charging flash unit which is charged between the time a camera shutter-release member is initially actuated and the time an exposure commences. The camera has a shield which is moved from a normal viewfinder-covering position to a viewfinder-uncovering position in response to actuation of the release member. As the shield is moved, the flash unit commences to charge, even before the operator can view the scene in the viewfinder. The operator would not depress the release member further to make an exposure until the scene has been framed. For most picture-taking situations, the framing time requires a few seconds, which are adequate to allow the flash unit to fully charge. Although an exposure can be made once the scene is framed, without waiting for the flash unit to charge, the camera operator could override the flash charging system if the release member is jabbed or stabbed.

U.S. Pat. No. 4,084,167 describes camera structure for charging a built-in strobe flash unit when a shutter-release member is actuated. If scene brightness is low, an electromagnet latches the release member in a pre-exposure position while the flash unit charges. Once the flash is charged, the electromagnet is actuated. This frees the release member for final movement by the camera operator to open the shutter. This camera structure would avoid taking an exposure without necessary flash.

However, interrupting movement of the release member to wait for flash charging is annoying to both a photographic subject and a camera operator. A longer indefinite posing time is required and the additional uncertainty as to when an exposure is to occur makes it more difficult for a subject to maintain the proper pose.

It is also known in the prior art to provide for charging an electronic strobe flash unit in response to actuation of a camera shutter-release member, without appreciably delaying execution of an exposure operation. U.S. Pat. No. 4,182,561 describes a camera having a fast-charging flash unit which is intended to be charged in response to a continuous uninterrupted stroke of a release member, during a brief interval of time between initial actuation of the member, which sets the camera for an exposure, and final actuation of the release member, which causes an exposure. The flash unit employs a 120-volt battery for charging a flash-firing capacitor directly (without a DC to DC converter) during pre-exposure operation of the camera. A battery of this type is not readily suitable for use with a compact electronically operated camera having low-voltage integrated circuits. Thus, a separate battery would be needed for the camera.

SUMMARY OF THE INVENTION

A camera has an electronic strobe flash unit which is charged in response to actuation of a shutter-release member, for initiating an exposure operation. In accordance with the invention, movement of the shutter-release member to irreversibly commit the camera to make an exposure, provides a potential delay, prior to exposure, for supplementary charging of the flash unit to a level which is at least sufficient to produce a flash. Thus, a flash is assured independently of the actuation speed of the release member.

In a preferred embodiment, the invention is carried out as follows: A release member, for causing an exposure operation, is arranged to be moved from a first, inactive position to a second, intermediate position in which the exposure operation is reversibly initiated, and from the second position to a third position in which the exposure operation is irreversibly initiated. Delay means, responsive to the release member moving into its third position, establishes a short interval to delay effecting an exposure when the flash unit is charged less than a predetermined amount. Charge controlling means causes charging of the flash unit during the short interval to a level which is at least sufficient to fire the flash unit. A shutter-actuation member, responsive to terminating flash unit charging during the short interval, causes the shutter to open.

We have found that, once the exposure operation is irreversibly initiated, delaying an exposure less than 1/5 second is not noticeable to a camera operator. Once the delay exceeds ¾ second, it is generally detectable, although not to the point that exposure quality is adversely affected. The usual reaction of an operator to the delay is to press the release member more forcefully which has no affect on exposure. In our preferred embodiment, we have selected approximately 7/10 second as the maximum delay for charging.

However, to reduce the likelihood of the full delay, or any delay at all, three other time-limited charging intervals are provided while the camera is operating. First, an electrical power switch is closed if a cover is opened from its normal lens-covering position, and a film-loading door is in a closed condition. Whenever the power switch closes, flash charging is caused to occur for a predetermined interval.

Second, after an exposure and film is advanced for the next exposure, an interval is provided for flash charging. The interval after the power switch closes and the interval after film advance both are overridden if the operator actuates the release member for an exposure. Thus, the amounts of flash charging are dependent upon the frequency exposures are made.

Flash charging also occurs during the time the release member is moved beyond the intermediate position to its third position. The travel time of the release member between its second and third positions and, thus, the amount of charging, are dependent upon the actuation speed of the release member.

We have found that generally the total time provided by these three intervals is sufficient to fully or nearly fully charge the flash unit. The potential delay we provide for after an exposure operation is irreversibly initiated, but prior to an exposure, is usually much less than the maximum delay of approximately 7/10 second, because, at most, only a minimal amount of time is needed to supplement or "top off" the charge of the flash unit. In most picture-taking situations, the delay used is not noticeable to a camera operator, or if it is detected, does not adversely affect the ensuing exposure.

The invention, and its advantages, will become more apparent in the detailed description of a preferred embodiment presented below.

DESCRIPTION OF THE DRAWINGS

In a detailed description of a preferred embodiment of the invention presented below, reference is made to the accompanying drawings, in which.

DETAILED DESCRIPTION OF A PREFERRED EMBODIMENT

Because photographic cameras and electronic strobe flash units are well known, the present description will be directed in particular to elements forming part of, or cooperating directly with, apparatus in accordance with the present invention. It is to be understood that camera and strobe flash elements not specifically shown or described may take various forms well known to those having skill in the art.

Figure 1:
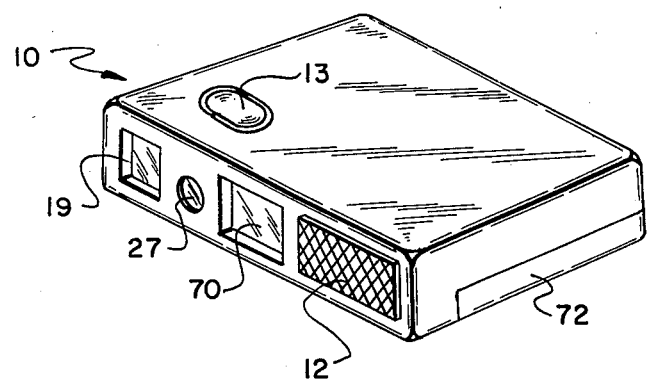
FIG. 1 is a perspective view of a camera having an electronic strobe flash unit.

Referring to FIG. 1, a camera 10 is provided with an electronic strobe flash unit 12, which may be formed either as an integral part of the camera, as shown, or, alternatively, may be detachable from the camera.

A flash or an ambient exposure occurs in response to a camera operator depressing a photographic cycle shutter-release member 13. Also, the flash unit 12 charges in response to movement of the member 13.

Figure 2:
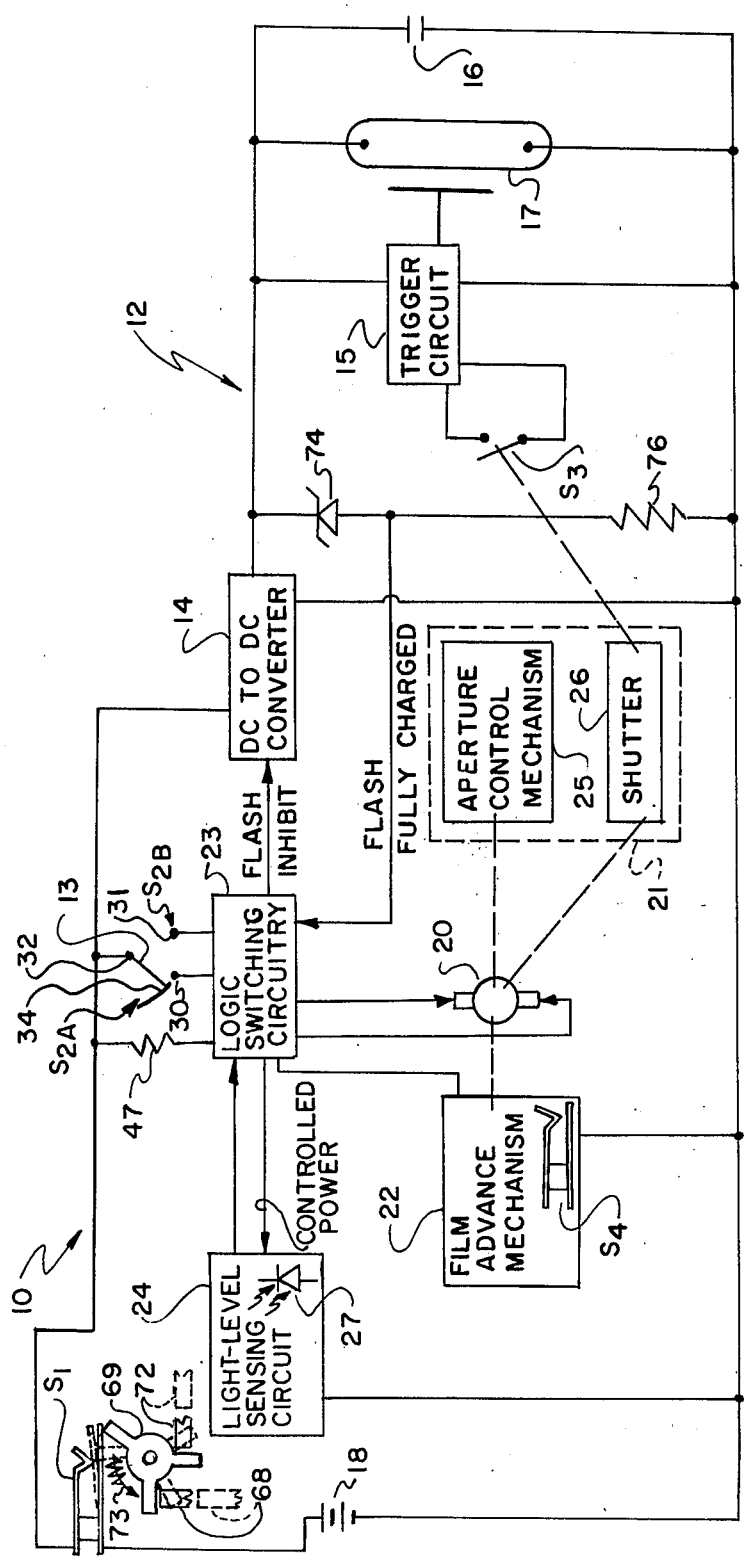
FIG. 2 is a block diagram of the camera and electronic strobe flash unit of FIG. 1.

Referring now to FIG. 2, the electronic strobe flash unit 12 comprises a DC to DC converter 14 and a conventional flash trigger circuit 15. By means well known in the electronic strobe flash art, the converter 14 is arranged to charge a flash-firing capacitor 16 to a voltage that is necessary to fire a flash tube 17.

A full charge exists when the capacitor 16 is charged to approximately 200 volts. The flash tube 17 can be reliably fired when the capacitor 16 is charged to an intermediate voltage, approximately 140 volts.

A low-voltage battery 18, for example a 6-volt battery, and the converter 14 are arranged to charge the capacitor 16 from the tube's extinguishing voltage (approximately 30 volts) to 140 volts within approximately 7/10 second, and to the full 200 volts within approximately 1.5 seconds.

The camera 10 has a bi-directional motor 20, which actuates camera exposure control apparatus 21 and a film advance mechanism 22 for effecting respectively camera exposure and film advance functions, logic switching circuitry 23 for controlling both charging of the flash unit 12 and energizing of the motor 20, and a light-level sensing circuit 24 for measuring ambient light intensity.

The exposure control apparatus 21 includes an aperture control mechanism 25 for adjusting the size of an exposure aperture, and a shutter 26 for uncovering and covering the exposure aperture to control an exposure interval. The motor 20 sequentially actuates the exposure control apparatus 21 and the film advance mechanism 22, which together constitute a highly automated system for effecting a photographic cycle. That system is more fully described in U.S. patent application Ser. No. 235,491, filed Feb. 18, 1981, in the name of R. Cloutier and entitled "CAMERA MECHANISM", the disclosure of which is incorporated herein by reference.

The film advance mechanism 22 includes a film-metering pawl (not shown) for positioning film loaded in the camera 10 for an exposure. A normally open film-metering switch S4 is held closed by the pawl when it is positioned between adjacent notches located seriatim along an edge portion of the film, and the switch S4 is open when the pawl is located within a film notch or perforation, i.e. the pawl is registering film for an exposure. The condition of the switch S4 provides an input to the switching circuit 23 for sequentially controlling the flash unit 12 and the motor 20.

The circuit 24, which includes a photodiode 27 arranged to sense ambient light, produces a logic level 1 output voltage (relatively high voltage) when scene light intensity is above a predetermined level, approximately 125 foot-lamberts, and produces a logic level 0 voltage (relatively low voltage) when scene light intensity is below 125 foot-lamberts. The output voltage of the circuit 24 is another input to the circuit 23 for controlling the flash unit 12 and the motor 20.

The circuitry of FIG. 2 causes charging of the flash unit 12 in a manner to provide a full or nearly full flash light output without significantly delaying an exposure to wait for flash charging, while otherwise maintaining the converter 14 off during times the camera 10 is not being used. To assist in preventing annoying delay in making a flash exposure, when a camera operator lightly touches the member 13, such as would occur when the camera 10 is held in a normal picture-taking position, an exposure operation, which includes flash charging, is reversibly initiated. Once the release member 13 is depressed sufficiently to make an exposure, i.e. the exposure operation is irreversibly initiated, a brief potential delay is provided, prior to exposure, to supplement or "top off" the flash charge. This delay, which depends upon the additional amount of charging that is needed but which does not exceed approximately 7/10 second, assures that a flash occurs independently of the speed at which the member 13 is depressed to irreversibly initiate an exposure operation.

To bolster the level the flash unit 12 is charged to prior to irreversibly initiating an exposure operation, a highly sensitive "wakeup" switch $S_{2A}$ is provided for commencing flash charging when only very light pressure is applied to the member 13. The pressure required is so slight that an operator may not be aware that the wakeup switch $S_{2A}$ has been actuated. For example, light finger pressure on the release member 13 while the camera 10 is being pointed at a scene or while a scene is being framed in the camera's viewfinder 19 is sufficient to initiate flash charging. Thus, the wakeup switch $S_{2A}$ can extend the pre-exposure time during which charging occurs to include, for example, scene framing time, in addition to the time used to depress the release member 13 sufficiently, to cause the shutter 26 to open. Thus, the delay for supplementary charging may not be needed or only a fraction of the delay is necessary, as described later.

In a situation where the pre-exposure actuation time of the member 13 is very brief, such as when the member 13 is not actuated as the camera 10 is held in a picture-taking position, and the camera operator jabs or stabs the member 13 to effect an exposure, an exposure may be delayed the maximum interval of 7/10 second for flash charging, after the exposure operation is irreversibly initiated. This delay, although not sufficient in itself to provide a full charge, is long enough to allow the capacitor 16 to charge above a minimum voltage that is necessary to fire the flash tube 17. On the other hand, the full delay is not so long that it disturbs the camera operator to the point that an exposure is adversely affected.

Figure 3:
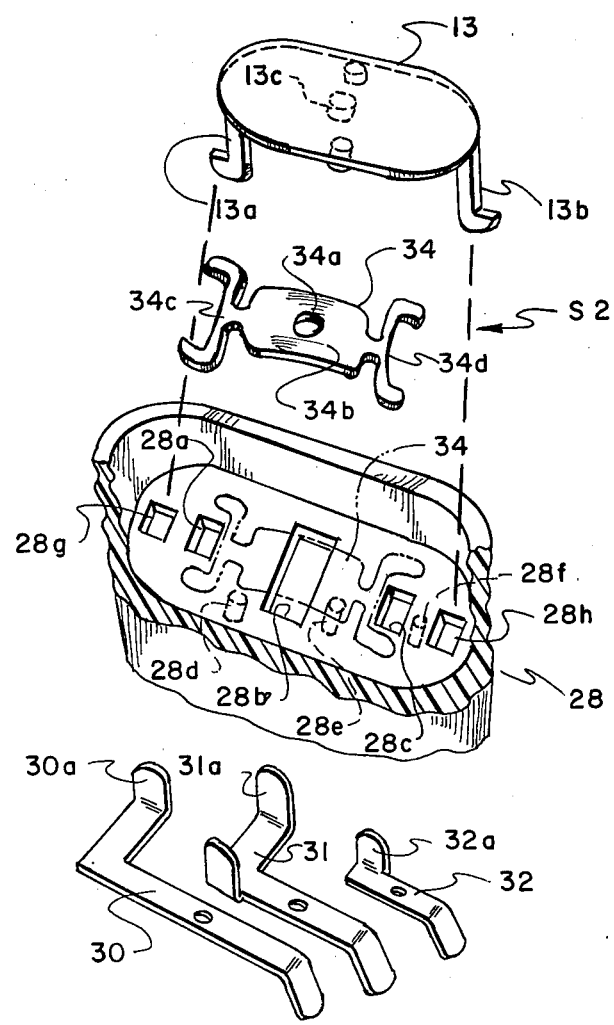
FIG. 3 is an exploded view of a switch assembly, which is responsive to a shutter-release member.
Figure 4:
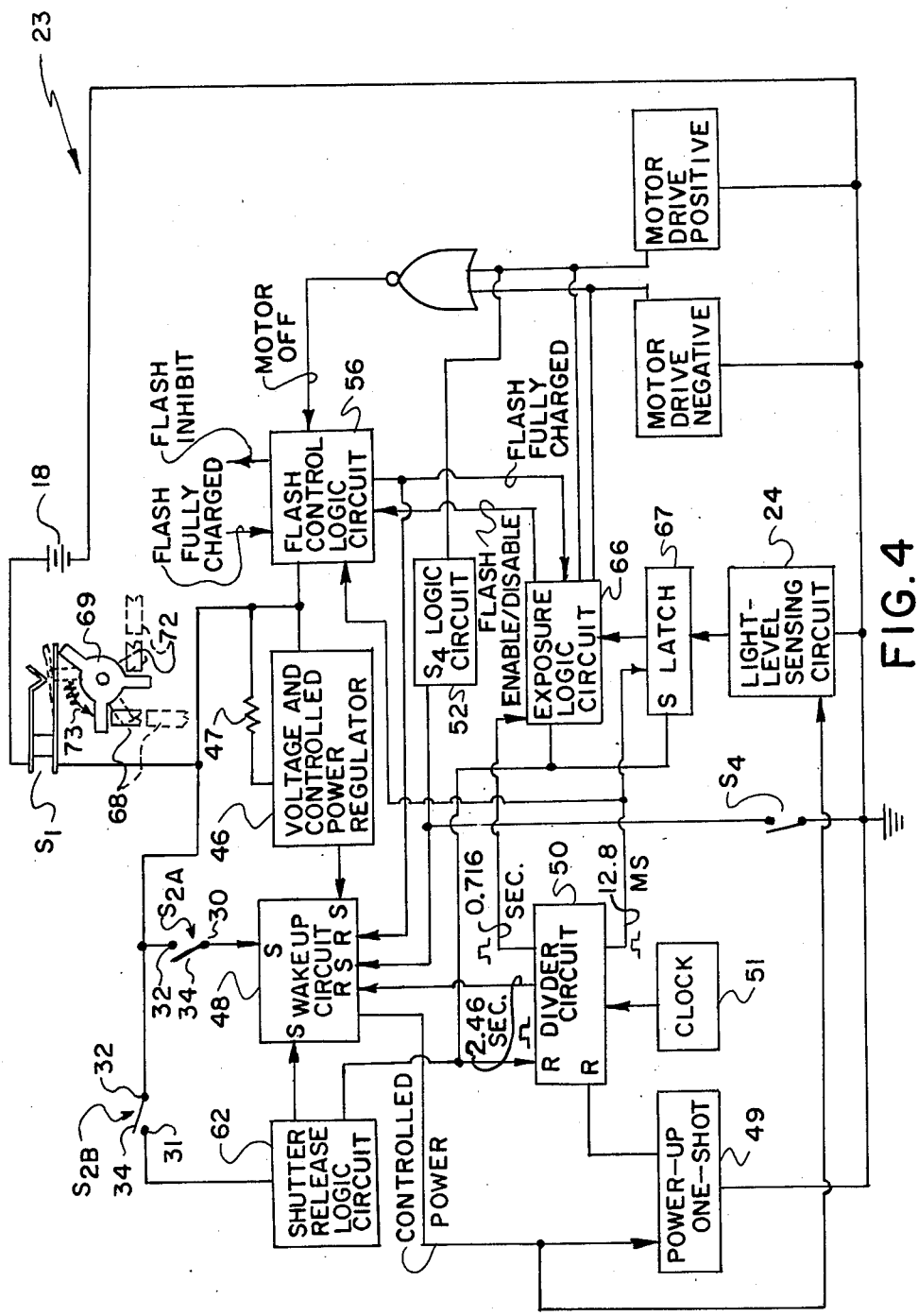
FIG. 4 is a more detailed block diagram of circuitry, according to the invention, for controlling charging of the electronic strobe flash unit of FIG. 1 in response to actuation of the switch assembly of FIG. 3.

Referring now to FIG. 3, a switch assembly S2 is located immediately beneath the release member 13 in a switch-receiving pocket formed by a plastic body 28. The assembly S2 includes three electrically conductive contacts 30, 31 and 32, and an electrically conductive arcuate toggle joint 34. The contacts 30 and 32, and the toggle joint 34 form the highly sensitive wakeup switch $S_{2A}$ (FIGS. 2 and 4), and the contacts 31 and 32, and the toggle joint 34 form a shutter-release switch $S_{2B}$ (FIGS. 2 and 4).

Each of the contacts 30, 31, and 32 has a projecting portion 30a, 31a, and 32a, respectively, which projects into the switch-receiving pocket through corresponding rectangular-shaped receiving apertures 28a, 28b, and 28c, which are located in the bottom of the body 28. The contacts 30, 31, and 32 are heat sealed in their respective positions to the underside of the body 28 by bosses 28d, 28e, and 28f, respectively.

The member 13 is aligned for limited vertical movement relative to the pocket of the body 28 by means of an opposed pair of depending L-shaped legs 13a and 13b, which are received respectively in apertures 28g and 28h located in the body 28. The member 13 aligns the toggle joint 34 within the top center of the pocket of the body 28 by means of an integral post 13c, which projects downwardly into a circular hole 34a. The hole 34a is located in the center of an arcuate portion 34b, which forms the knee of the toggle joint 34.

The location of the toggle joint 34 relative to the switch contacts, and the coupling between the toggle joint and the member 13 are important to the proper operation of the wakeup switch $S_{2A}$, and, thus, to pre-exposure charging of the flash unit 12.

The toggle joint 34 serves as a leaf spring which lightly biases the member 13 upwardly in a first position when it is deactuated. In its deactuated position, the member 13 aligns the toggle joint 34 so that its fork-shaped end segments 34c and 34d remain just out of contact with the projections 30a and 32a, respectively, as shown by the dashed lines of FIG. 3. Additionally, by virtue of its radius of curvature, the knee 34b lies above the projecting portion 31a, somewhat further displaced from the contact 31 then the segments 34c and 34d are displaced respectively from the projections 30a and 32a. Thus, when the member 13 is deactuated, both the wakeup switch $S_{2A}$ and the shutter-release switch $S_{2B}$ are open.

When only slight downward pressure is applied to the member 13, such as when an operator places a finger on the member 13 in anticipation of making an exposure, the knee 34b of the toggle joint 34 depresses slightly, which causes both fork segments 34c and 34d to slide radially outwardly. This causes the forks 34c and 34d to contact respectively the projections 30a and 32a. However, the knee 34b, although closer to the projection 31a, remains out of contact with it. Thus, when only slight pressure is applied to the member 13, to move it to a second, intermediate position, the wakeup switch $S_{2A}$ is closed, but the shutter-release switch $S_{2B}$ is still open. When the switch $S_{2A}$ closes, an exposure operation is reversibly initiated.

When additional pressure is applied to the member 13, i.e. it is "more fully actuated", it moves from its intermediate position to a third position, which causes the shutter 26 to open. When the member 13 is in its third position, the knee 34b toggles downwardly, thereby engaging the contact 31a. The forks 34c and 34d remain in contact with the projections 30a and 32a. Thus, when the member 13 is in its third position, the wakeup switch $S_{2A}$ and the shutter-release switch $S_{2B}$ are both closed. As described below, once the switch $S_{2B}$ has been closed for a brief interval, the exposure operation is irreversible.

The logic switching circuitry 23 for controlling the camera 10 and the flash unit 12 is shown in greater detail in FIG. 4. It will be readily apparent from the following description that the circuitry 23 is constituted primarily by a variety of conventional low-power digital logic gates, which may be readily manufactured in integrated circuit form.

A voltage and controlled power regulator 46, which is connected to the battery 18 through a normally open power switch $S_1$ and an external resistor 47, provides controlled operating voltages and currents for the logic gates constituting the switching circuitry 23.

A wakeup circuit 48 constitutes a latch, which is set when battery power is applied to the regulator 46, i.e. when the switch $S_1$ closes. Additionally, so long as the switch $S_1$ is closed, the latch is also set when the wakeup switch $S_{2A}$ closes, the shutter-release switch $S_{2B}$ closes, or the film-metering switch $S_4$ closes.

When the latch is set, the circuit 48 applies a controlled amount of power externally to the light-level sensing circuit 24, as shown in FIG. 4. It also supplies controlled power internally to circuitry 23, to a power-up 1-shot 49. While controlled power is supplied, a high-level operational current is drawn from the battery 18.

The latch of the circuit 48 is reset when any of a variety of camera and/or flash conditions exist, as described below. When the latch is reset, only a low-level quiescent current is drawn from the battery 18, to conserve its power.

The 1-shot 49 is arranged to reset a divider circuit 50, when controlled power is supplied.

The divider 50, which is supplied with a 10-khz pulse train by a clock 51, includes seventeen cascaded flip-flops arranged to provide various timing pulses, of different lengths. These pulses are used to enable and/or disable various circuits of switching circuitry 23 in a timed manner.

The timing pulses produced by the divider 50 that are most important to the operation of the flash charging apparatus are a 12.8-ms pulse, a 0.716-second pulse, and a 2.46-second pulse. The 12.8-ms pulse is used to prevent flash charging immediately after controlled power is supplied, while electrical transients subside. It also establishes an interval during which the light-level sensing circuit 24 measures scene light intensity, for the purpose of controlling a subsequent exposure.

The 0.716-second pulse limits the delay used for supplementary flash charging.

The 2.46-second pulse limits both the interval used for flash charging when the power switch $S_1$ closes, and the interval used for flash charging after an exposed film frame is advanced.

An $S_4$ logic circuit 52 is arranged to drive the motor 20 in a positive direction when the film-metering switch $S_4$ is closed. When the switch $S_4$ enables the circuit 52, the motor 20 causes the film drive mechanism 22 to advance camera film.

A flash control logic circuit 56 turns the converter 14 on and off. The circuit 56 produces a FLASH INHIBIT signal, which turns the converter 14 off, while either the 12.8-ms timing pulse produced by the divider 50 is present, the motor 20 is running, or the flash unit 12 is fully charged. Otherwise, the circuit 56 causes the converter 14 to charge the flash unit 12 when controlled power is turned on by the wake-up circuit 48.

The circuit 56 also resets the wakeup circuit 48 when both the motor 20 is off and the flash unit 12 is fully charged, so long as at least 12.8 milliseconds have elapsed since the divider 50 was last reset.

A shutter-release logic circuit 62 is arranged to enable an exposure logic circuit 66, reset the divider 50, and set a latch 67, in response to closing of the shutter-release switch $S_{2B}$. Additionally, the circuit 62 causes the wakeup circuit 48 to hold controlled power on so long as the switch $S_{2B}$ remains closed.

The switch $S_{2B}$ must remain closed for 12.8 milliseconds, else the latch 67 is reset. When the latch 67 has been set for 12.8 milliseconds, it provides a digital logic signal to the circuit 66 corresponding to the scene light intensity sensed by the light-level sensing circuit 24. A logic level 0 signal corresponds to relatively low ambient light, and a logic level 1 signal corresponds to relatively bright ambient light.

The exposure logic circuit 66, which causes an exposure to occur, is arranged to energize the motor 20, in response to receiving the digital logic signal from the latch 67. The circuit 66 is enabled to cause the motor 20 to be driven in a positive direction, in response to a logic level 0 signal being supplied by the latch 67. In this direction, the motor 20 causes the aperture control mechanism 25 to set an exposure aperture at f/2.8, and the shutter 26 operates at 1/100 second.

The circuit 66 causes the motor 20 to be driven in a negative direction in response to a logic level 1 signal from the latch 67. In this direction, the motor 20 causes the mechanism 25 to set the exposure aperture at f/6, and the shutter 26 operates at 1/200 second.

When scene light is low, the circuit 66 signals the flash control logic circuit 56 to enable the converter 14. If the flash unit 12 is not fully charged, the circuit 66 temporarily delays energizing the motor 20, to allow for supplementary charging to occur prior to an exposure. When either the 0.716-second pulse, produced by the divider 50, terminates or a FLASH FULLY CHARGED signal is received from the circuit 56, whichever occurs first, the exposure logic circuit 66 then drives the motor 20 in the positive direction.

When a dust cover or shield 68 (FIGS. 2 and 4) covers a taking lens 70 (FIG. 1), or when a film-loading door 72 (FIGS. 1, 2 and 4) is open, a pivot 69 is blocked from moving in the counterclockwise direction under the influence of a bias spring 73. When the pivot 69 is blocked, the switch $S_1$ is open. The aforementioned U.S. Pat. Nos. 3,296,949 and 4,189,222 show a movable cover for uncovering and covering the taking lens of a camera.

When both the cover 68 is moved to a lens-uncovering position and the door 72 is closed, shown by the dashed lines of FIGS. 2 and 4, the pivot 69 moves in the counterclockwise direction under the influence of the spring 73, to close the switch $S_1$. When the switch $S_1$ closes, the wakeup circuit 48 is set, and thereby supplies controlled power to the circuitry 23 and the light-level sensing circuit 24.

To simplify the description of the operation of apparatus for charging the flash unit 12 in response to actuation of the shutter-release member 13, it is assumed that the lens 70 is uncovered, the door 72 is closed and the camera 10 is loaded with film, and the film-metering pawl is located within a film perforation. Thus, the switch $S_1$ is closed and the switch $S_4$ is open.

To initiate an exposure operation, the member 13 is moved from its first, deactuated position to its second, intermediate position so as to close the wakeup switch $S_{2A}$. It will be readily apparent from the above, closing of the switch $S_{2A}$ can occur as the camera operator merely positions a finger on the member 13, for example, in anticipation to take a picture. In response to closing the wakeup switch $S_{2A}$, the latch in the wakeup circuit 48 is set, which supplies controlled power to the converter 14, the light-level sensing circuit 24, and the 1-shot 49. The divider 50 initializes the 12.8-ms, 0.716-second, and the 2.46-second timing pulses.

During the 12.8-ms interval immediately following closing of the wakeup switch $S_{2A}$, the flash logic control circuit 56 is inhibited by the 12.8-ms pulse. At the end of this brief interval, the circuit 56 causes the converter 14 to charge the flash unit 12, if it is charged less than its full charge of 200 volts.

Until the member 13 is moved from its intermediate position into its third position, which closes the shutter-release switch $S_{2B}$, the flash unit 12 continues to charge so long as it is less than fully charged. If prior to closing the switch $S_{2B}$, the flash unit 12 becomes fully charged, a zener diode 74 (FIG. 2) conducts. This conduction produces the FLASH FULLY CHARGED signal, at the junction between the diode 74 and the resistor 76. In response to this signal, the circuit 56 produces the FLASH INHIBIT signal, which turns the converter 14 off. Because the motor 20 is off at this time, the circuit 56 also resets the wakeup circuit 48, thereby reducing battery current to a quiescent level.

Whether or not the flash unit 12 becomes fully charged prior to closing the shutter-release switch $S_{2B}$, when the switch $S_{2B}$ closes, the shutter-release logic circuit 62 sets both the wakeup circuit 48 and the latch 67, resets the divider 50, and enables the exposure logic circuit 66.

During the 12.8-ms interval immediately following closing of the switch $S_{2B}$, the flash logic control circuit 56 is again inhibited by means of the 12.8-ms timing pulse produced in response to resetting the divider 50. During this time, the light-level sensing circuit 24 measures scene light intensity.

If the camera operator happens to have deactuated the member 13 sufficiently to allow the shutter-release switch $S_{2B}$ to reopen prior to termination of the 12.8-millisecond interval, the latch 67 is reset, and an exposure will not occur. However, if the shutter-release switch $S_{2B}$ is closed for at least 12.8 milliseconds, the exposure operation is now irreversibly initiated, and an exposure is made, as follows, regardless of the state of the switch $S_{2B}$.

At the end of the 12.8-ms interval, the latch 67 produces a logic level 1 output signal (high voltage) when the circuit 24 measures scene light intensity above approximately 125 foot-lamberts, and the latch 67 produces a logic level 0 signal (low voltage) when the circuit 24 senses scene light intensity below 125 foot-lamberts.

The latch 67 supplies the logic signal corresponding to ambient light intensity to the exposure logic circuit 66. If ambient light is low, the circuit 66 enables the flash control circuit 56. If the flash unit 12 is not fully charged, the circuit 56 causes the converter 14 to initiate supplemental charging of the flash unit 12.

A race condition develops between fully charging the flash unit 12 and terminating the 0.716-second pulse produced by the divider 50 when the switch $S_{2B}$ is closed. If the flash unit 12 becomes fully charged first, the FLASH FULLY CHARGED signal is produced at the junction between the diode 74 and the resistor 76. That signal causes the circuit 56 to turn the converter 14 off, and causes the circuit 56 to enable the exposure logic circuit 66.

If the 0.716-sec. pulse terminates first, that event enables the circuit 66 which causes the circuit 56 to turn the converter 14 off.

In either case, an exposure occurs immediately in response to terminating supplemental flash charging. The exposure logic circuit 66 causes the motor 20 to be driven in the positive direction. This causes the aperture control mechanism 25 to set an exposure aperture at f/2.8, then causes the shutter 26 to operate at 1/100 second. At this speed, the shutter 26 closes a normally open flash synchronization switch $S_3$, which fires the flash unit 12 during exposure.

In bright ambient light, flash illumination is not used. In this case, the logic level 1 signal produced by the latch 67 causes the circuit 66 to drive the motor 20 in a negative direction, immediately after the latch 67 signals to the circuit 66 that scene light intensity is relatively bright. The aperture control mechanism 25 is set at an f/6 exposure aperture, then the shutter 26 is operated at 1/200 second.

To complete the description of an exposure operation, once either an ambient or a flash exposure is completed, the motor 20 causes actuation of the film-metering pawl which closes the switch $S_4$. In response to closing the switch $S_4$, the wakeup circuit 48 is again set, which causes reinitializing of the timing pulses produced by the divider 50. Additionally, the $S_4$ logic circuit 52 causes the motor 20 to be driven in the positive direction, thereby advancing film. When film has been advanced one frame, which requires less than about $\frac{1}{4}$ second, the metering pawl drops into the next film notch, thus opening the switch $S_4$. In response to opening the switch $S_4$, the circuit 52 turns the motor 20 off.

When film advance is terminated, the exposure operation is completed. However, the logic switching circuit 23 continues to function to prepare the flash unit 12 for the next exposure. When the motor 20 turns off following film advance, the logic circuit 56 reinitiates charging of the flash unit 12.

So long as the shutter-release member 13 is not reactuated in anticipation of a subsequent exposure operation, a race condition develops between fully charging the flash unit 12 and terminating the 2.46-second pulse produced by divider 50, when the switch $S_4$ is closed at the end of an exposure. If the prior exposure was solely in ambient light, most likely little if any additional charging would be necessary to produce the FLASH FULLY CHARGED signal. If the prior exposure occurred with flash light, a longer charging interval would be necessary for restoring the flash charge, to produce the FLASH FULLY CHARGED signal. In either case, flash charging is reinitiated by the circuit 56.

The FLASH FULLY CHARGED signal then causes the circuit 56 to turn the converter 14 off.

If, for whatever reason, flash charging is still occurring 2.46 seconds after the switch S4 is closed after an exposure, terminating the 2.46-second pulse produced by the divider 50 resets the wakeup circuit 48. This decreases the battery current to the aforementioned low-power, quiescent level, which turns the converter 14 off.

The flash charging that occurs after an exposure further assists in providing a full or nearly full flash charge for the next exposure at the time the release member 13 causes the shutter-release switch $S_{2B}$ to close. This charging, of course, prepares the flash unit 12 for an exposure of all film frames other than the first frame in a film roll or cartridge.

To assist in providing a full flash charge prior to the first exposure, the logic switching circuit 23 provides for automatically charging the flash unit 12 in response to closing the film-loading door 72. So long as the lens 70 is uncovered, the power switch $S_1$ closes when the film-loading door 72 closes. Thus, when film is loaded into the camera 10 when the lens 70 is already uncovered, the switch $S_1$ closes in response to closing the door 72. In response to closing the switch $S_1$, the wakeup circuit 48 is set, and the divider 50 produces its timing pulses.

When film is loaded in the camera 10, the film-metering pawl may be located between adjacent film notches. Thus, the switch S4 may be closed when the camera 10 is initially loaded with film. If the switch S4 is closed, the logic circuit 52 energizes the motor 20, to advance the film. Film is advanced until the metering pawl drops into a film notch, thereby opening the switch S4. This switch condition causes the circuit 52 to turn the motor 20 off.

If 12.8 milliseconds have elapsed since the wakeup circuit 48 was set, once the motor 20 is off, the flash control logic circuit 56 turns the converter 14 on. If 12.8 milliseconds have not elapsed, for example, the film-metering pawl was already registering film when the switch $S_1$ closes, as soon as the 12.8-ms timing pulse produced by the divider 50 has terminated, the circuit 56 turns the converter 14 on.

As was described in regard to charging the flash unit 12 after film advance following an exposure, a race condition develops between fully charging the flash unit 12 and terminating the 2.46-second pulse, so long as the member 13 is not actuated. Assuming the converter 14 is operating in its intended manner, the FLASH FULLY CHARGED signal would be produced first, and thus the converter would turn off as a result of that signal. Thus, the flash unit 12 is charged in response to closing the film-loading door 72, prior to exposing the first film frame. U.S. Pat. No. 3,917,395 describes a camera having a strobe flash unit which is charged automatically in response to closing a door to a film-receiving chamber.

It will be readily apparent that if a camera operator actuates the member 13 shortly after the switch $S_1$ closes, or shortly after an exposed film frame is advanced, the flash unit 12 may not be fully charged prior to irreversibly initiating an exposure operation. Consequently, the potential maximum delay of about 7/10 second becomes important in assuring that the flash unit 12 is sufficiently charged for a flash exposure.

A purpose of the 2.46-second timing pulse produced by the divider 50 is to prevent inadvertently draining battery power. It is readily apparent from the above description of the flash charging apparatus that this timing pulse prevents the drawing of controlled power from the battery 18 for longer than 2.46 seconds after the power switch $S_1$ is closed while the camera 10 is idle. Additionally, if a camera malfunction occurs during an exposure operation, for example, the film becomes bound during film transport, the 2.46-second pulse causes controlled power to be removed from the camera 10.

The invention has been described in detail with particular reference to a preferred embodiment thereof, but it will be understood that variations and modifications can be effected within the spirit and scope of the invention. For example, although the camera 10 makes a flash exposure only in low ambient light, it will be understood that the invention is also applicable to a camera which fires a flash independently of ambient light.

What is claimed is:

1. In a camera having a shutter operable for regulating an exposure operation, and charging means for electronic strobe flash apparatus, the improvement comprising:
   (a) a shutter-releasing member movable from a first position in which the exposure operation is reversible, to a second position in which the exposure operation is irreversibly initiated;
   (b) delay means, responsive to movement of said shutter-releasing member to its second position, for establishing an interval to delay operation of said shutter; and
   (c) charge controlling means, coupled to said delay means, for activating said charging means during the delay interval to a level which is at least sufficient to fire electronic strobe flash apparatus.

2. In a camera having a shutter, shutter-actuating means for opening and closing said shutter, and charging means for charging electronic strobe flash apparatus, the improvement comprising:
   (a) a shutter-releasing member movable from a first position in which an exposure operation is reversibly initiated, to a second position in which the exposure operation is irreversibly initiated;
   (b) delay means, responsive to movement of said shutter-releasing member to its second position, for establishing a potential interval to delay operation of said shutter; and
   (c) charge controlling means, coupled to said delay means, for delaying operation of said shutter when the flash apparatus is charged less than a predetermined amount, and for activating said charging means during the interval to at least a minimum level sufficient to fire electronic strobe flash apparatus;
   (d) said shutter-actuating means being responsive to said charging means terminating charging of the strobe flash apparatus, to cause said shutter to open.

3. In a camera having a shutter, and charging means for charging electronic strobe flash apparatus, the improvement comprising:
   (a) a shutter-releasing member movable from a first position to an intermediate position to reversibly initiate an exposure operation, and from said intermediate position to a third position to irreversibly initiate the exposure operation;
   (b) delay means, responsive to movement of said shutter-releasing member beyond its intermediate position to its third position, for delaying a resulting operation of said shutter when the strobe flash apparatus is charged less than a predetermined amount; and (c) charge controlling means, for activating said charging means (1) upon movement of said shutter-releasing member from its first to its intermediate position, and (2) while said shutter is delayed, the cumulative charge occurring while said shutter-releasing member is moved from its first to its third position being adequate to fire electronic strobe flash apparatus.

4. In a camera having a shutter, charging means for charging electronic strobe flash apparatus, and switch means having first and second conditions for respectively switching said camera into ambient and flash exposure modes, the improvement comprising:

(a) a shutter-releasing member movable from a first position in which an exposure operation is reversible, to a second position in which the exposure operation is irreversibly initiated;

(b) delay means, responsive to movement of said shutter-releasing member to its second position and said switch means being in its second condition, for establishing an interval to delay operation of said shutter; and (c) charge controlling means, coupled to said delay means, for activating said charging means during the delay interval between (1) a first level which is at least adequate to fire electronic strobe flash apparatus, and (2) a second level which produces full flash light output.

5. In a camera having a shutter, shutter-actuating means for opening and closing said shutter, charging means for charging electronic strobe flash apparatus, and switch means having first and second conditions for respectively switching said camera into ambient and flash exposure modes, the improvement comprising:

(a) a shutter-releasing member movable from a first position in which an exposure operation is reversibly initiated, to a second position in which the exposure operation is irreversibly initiated;

(b) delay means, responsive to movement of said shutter-releasing member to its second position and said switch means being in its second condition, for establishing a potential interval to delay operation of said shutter; and (c) charge controlling means, coupled to said delay means, for delaying operation of said shutter when the strobe flash apparatus is charged less than a predetermined amount, and for activating said charging means to charge said flash apparatus during the interval to a level which is at least sufficient to fire electronic strobe flash apparatus;

(d) said shutter-actuating means being responsive to said charging means terminating charging of the strobe flash apparatus, to cause said shutter to open.

* * * * *